(12) United States Patent
Shah et al.

(10) Patent No.: US 12,314,845 B2
(45) Date of Patent: May 27, 2025

(54) FIELD PROGRAMMABLE GATE ARRAY (FPGA) BASED NEUROMORPHIC COMPUTING ARCHITECTURE

(71) Applicant: Tata Consultancy Services Limited, Mumbai (IN)

(72) Inventors: Dhaval Shah, Thane West (IN); Sounak Dey, Kolkata (IN); Meripe Ajay Kumar, Bangalore (IN); Manoj Nambiar, Thane West (IN); Arpan Pal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 757 days.

(21) Appl. No.: 17/684,937

(22) Filed: Mar. 2, 2022

(65) Prior Publication Data
US 2023/0122192 A1    Apr. 20, 2023

(30) Foreign Application Priority Data
Oct. 14, 2021 (IN) .............................. 202121047012

(51) Int. Cl.
G06N 3/063 (2023.01)
G06N 3/049 (2023.01)
G06N 3/065 (2023.01)

(52) U.S. Cl.
CPC ............ *G06N 3/065* (2023.01); *G06N 3/049* (2013.01)

(58) Field of Classification Search
None
See application file for complete search history.

(56) References Cited

U.S. PATENT DOCUMENTS

| | | | |
|---|---|---|---|
| 10,095,718 B2* | 10/2018 | Birdwell | G06N 3/10 |
| 10,679,118 B2* | 6/2020 | Lin | G06F 17/16 |
| 11,354,568 B2* | 6/2022 | Akin | G06N 3/08 |
| 2009/0313195 A1* | 12/2009 | Mcdaid | G06N 3/049 |
| | | | 706/26 |

(Continued)

OTHER PUBLICATIONS

Abderrahmane et al., "Design Space Exploration of Hardware Spiking Neurons for Embedded Artificial Intelligence," (2019).

(Continued)

*Primary Examiner* — Maikhanh Nguyen
(74) *Attorney, Agent, or Firm* — Finnegan, Henderson, Farabow, Garrett & Dunner, LLP

(57) ABSTRACT

This disclosure relates generally to a method and a system for computing using a field programmable gate array (FPGA) neuromorphic architecture. Implementing energy efficient Artificial Intelligence (AI) applications at power constrained environment/devices is challenging due to huge energy consumption during both training and inferencing. The disclosure is a FPGA architecture based neuromorphic computing platform, the basic components include a plurality of neurons and memory. The FPGA neuromorphic architecture is parameterized, parallel and modular, thus enabling improved energy/inference and Latency-Throughput. Based on values of the plurality of features of the data set, the FPGA neuromorphic architecture is generated in a modular and parallel fashion. The output of the disclosed FPGA neuromorphic architecture is the plurality of output spikes from the neuron, which becomes the basis of inference for computing.

8 Claims, 10 Drawing Sheets

(56) References Cited

U.S. PATENT DOCUMENTS

| | | | |
|---|---|---|---|
| 2012/0173471 A1* | 7/2012 | Ananthanarayanan | G06N 3/049 706/29 |
| 2013/0151450 A1* | 6/2013 | Ponulak | G06N 3/049 706/25 |
| 2014/0222739 A1* | 8/2014 | Ponulak | G06N 3/049 706/25 |
| 2015/0106316 A1* | 4/2015 | Birdwell | G06N 3/086 706/33 |
| 2017/0286829 A1* | 10/2017 | Chen | G06N 3/063 |
| 2018/0174028 A1* | 6/2018 | Lin | G06N 3/04 |
| 2021/0125048 A1 | 4/2021 | Jang et al. | |

OTHER PUBLICATIONS

Azghadi et al., "Hardware Implementation of Deep Network Accelerators Towards Healthcare and Biomedical Applications," (2020).

Pani et al., "An FPGA Platform for Real-Time Simulation of Spiking Neuronal Networks," Frontiers in Neuroscience, 11:90 (2017).

Wang et al., "An FPGA-based Massively Parallel Neuromorphic Cortex Simulator," (2018).

\* cited by examiner

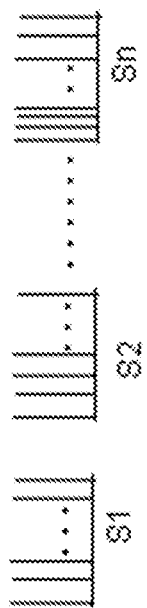
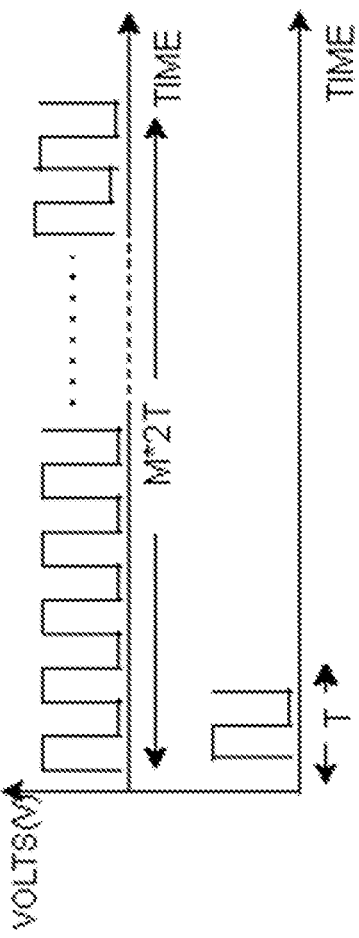

FIELD PROGRAMMABLE GATE ARRAY (FPGA) BASED NEUROMORPHIC COMPUTING ARCHITECTURE

PRIORITY CLAIM

This U.S. patent application claims priority under 35 U.S.C. § 119 to: India Application No. 202121047012, filed on 14 Oct. 2021. The entire contents of the aforementioned application are incorporated herein by reference.

TECHNICAL FIELD

The disclosure herein generally relates to computing, and, more particularly, to a method and a system for computing using a field programmable gate array (FPGA) neuromorphic architecture.

BACKGROUND

Implementing energy efficient Artificial Intelligence (AI) applications at power constrained environment/devices is challenging due to huge energy consumption during both training and inferencing.

The existing state of art techniques for computing in AI applications includes classical Machine Learning (ML)/Deep Learning (DL) methods that require huge power and memory both during training and inferencing. To overcome the challenge of requirement of huge memory and power, several other existing techniques for computing in AI application use mammalian brain inspired spiking neural networks (SNN) capable of learning and inferring from sparse data.

The SNN are implemented on large scale in ASIC (application-specific integrated circuit) based neuromorphic platforms. However, the ASIC based neuromorphic platforms allow development and testing within only a given limitations of number of neurons and synapses. Further, the ASIC based neuromorphic platforms can provide only sequential processing that may not be very efficient. Hence the researchers are also considering the possibility of using FPGA based scalable neuromorphic systems as FPGAs are more energy efficient than CPU/GPUs, can provide parallel processing capability and are flexibly reconfigurable to cater to different network model. However, the designing of FPGA based neuromorphic computing platforms to provide energy efficient computing is a much-researched field.

SUMMARY

Embodiments of the present disclosure present technological improvements as solutions to one or more of the above-mentioned technical problems recognized by the inventors in conventional systems. For example, in one embodiment, a method FPGA based neuromorphic computing architecture is provided. The system includes a memory storing instructions, one or more communication interfaces, and one or more hardware processors coupled to the memory via the one or more communication interfaces, wherein the one or more hardware processors are configured by the instructions to receive a synaptic weight, a data set associated with an application, wherein the data set comprises a plurality of features and a plurality of input spikes via an input module. The system further comprises a FPGA based neuromorphic computing architecture configured for computing a plurality of output spikes for the plurality of input spikes wherein the neuromorphic FPGA architecture is generated by optimizing a neuromorphic FPGA circuit, wherein the neuromorphic FPGA circuit is generated based on a Spiking Neural Network (SNN) technique, comprising: a memory configured for receiving and saving the synaptic weight; and a plurality of neurons, wherein each neuron among the plurality of neurons comprises a Multiply and accumulate (MA) layer, a Registered Adder (RAT) layer and a Leaky Integrate and Fire (LIF) layer.

In another aspect, a method for FPGA based neuromorphic computing architecture is provided. The method includes receiving a synaptic weight and a data set associated with an application, wherein the data set comprises a plurality of features and the synaptic weight is a pre-trained parameter. The method further includes generating a neuromorphic FPGA circuit comprising a memory and a plurality of neurons based on a Spiking Neural Network (SNN) technique, where in the generation of the neuromorphic FPGA circuit is characterized by comprising the following steps: generating transferring the synaptic weight to the memory and generating a plurality of neurons based on the plurality of features, wherein each neuron among the plurality of neurons comprises a Multiply and Accumulate (MA) layer, a Registered Adder Tree (RAT) layer and a Leaky Integrate and Fire (LIF) layer. The method further includes generating optimizing via the one or more hardware processors, the neuromorphic FPGA circuit based on the plurality of features to obtain a neuromorphic FPGA architecture, herein the optimization comprises an arrangement of the generated plurality of neurons in a modular and a parallel fashion based on the plurality of features. The method further includes generating receiving a plurality of input spikes], wherein the plurality of input spikes are associated with the data set. The method further includes generating computing a plurality of output spikes for the plurality of input spikes using the neuromorphic FPGA architecture, wherein the plurality of output spikes are utilized for classification and inferencing of the data set.

In yet another aspect, a non-transitory computer readable medium for FPGA based neuromorphic computing architecture is provided. The program includes receiving a synaptic weight and a data set associated with an application, wherein the data set comprises a plurality of features and the synaptic weight is a pre-trained parameter. The program further includes generating a neuromorphic FPGA circuit comprising a memory and a plurality of neurons based on a Spiking Neural Network (SNN) technique, where in the generation of the neuromorphic FPGA circuit is characterized by comprising the following steps: generating transferring the synaptic weight to the memory and generating a plurality of neurons based on the plurality of features, wherein each neuron among the plurality of neurons comprises a Multiply and Accumulate (MA) layer, a Registered Adder Tree (RAT) layer and a Leaky Integrate and Fire (LIF) layer. The program further includes generating optimizing via the one or more hardware processors, the neuromorphic FPGA circuit based on the plurality of features to obtain a neuromorphic FPGA architecture, herein the optimization comprises an arrangement of the generated plurality of neurons in a modular and a parallel fashion based on the plurality of features. The program further includes generating receiving a plurality of input spikes wherein the plurality of input spikes are associated with the data set. The program further includes generating computing a plurality of output spikes for the plurality of input spikes using the neuromorphic FPGA architecture, wherein the plurality of output spikes are utilized for classification and inferencing of the data set.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 8A, FIG. 8B and FIG. 8C illustrating a comparison of a plurality of input spike signal processing in an existing state of art technique for a input spike and the disclosed technique in accordance with some embodiments of the present disclosure.

DETAILED DESCRIPTION

Figure 1:
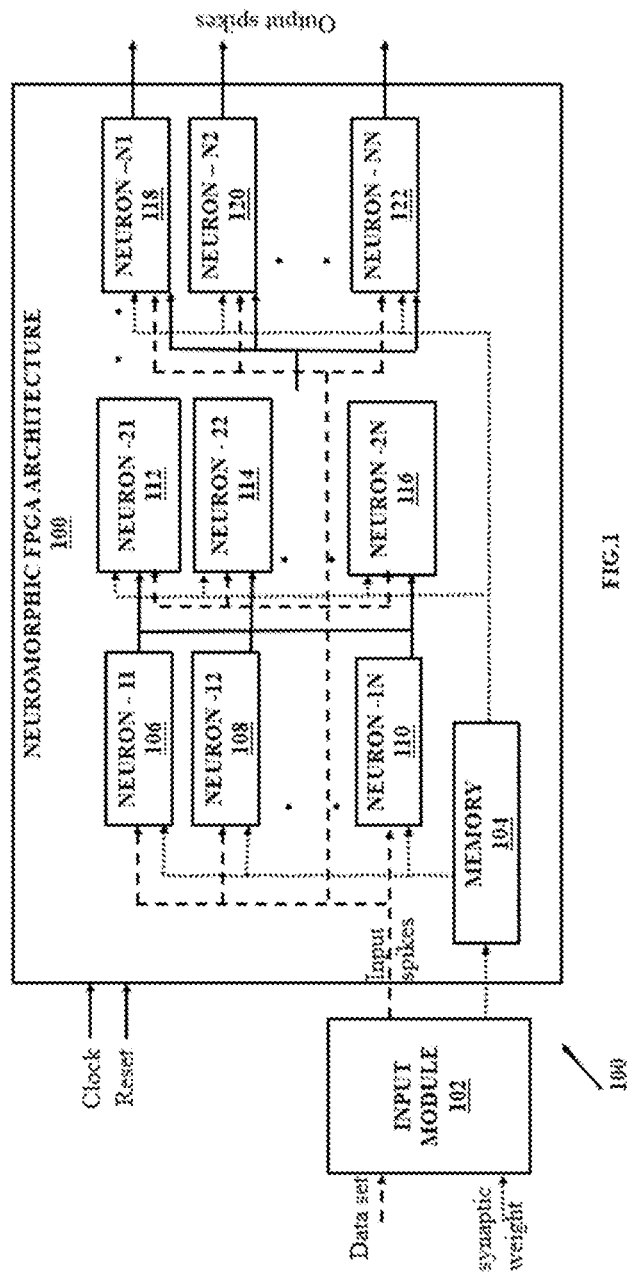
FIG. 1 illustrates an exemplary system for FPGA based neuromorphic computing architecture according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Referring now to the drawings, and more particularly to FIG. 1 through FIG. 8C, where similar reference characters denote corresponding features consistently throughout the figures, there are shown preferred embodiments and these embodiments are described in the context of the following exemplary system and/or method.

FIG. 1 is a functional block diagram of a system 100 for FPGA based neuromorphic computing architecture in accordance with some embodiments of the present disclosure. The neuromorphic FPGA architecture is generated by optimizing a neuromorphic FPGA circuit.

The basic component of the neuromorphic FPGA circuit that is optimized to generate the FPGA based neuromorphic architecture includes an input module (102), plurality of neurons (106-112) and one or more data storage devices or a memory (104). The memory (104) is operatively coupled to the plurality of neurons (106-112) to execute functions of one or more functional blocks of the system 100.

In an embodiment, the input module (102) configured for receiving a synaptic weight, a data set associated with an application, wherein the data set comprises a plurality of features and a plurality of input spikes.

In another embodiment, the input module (102) can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The system 100 further comprises the memory (104). The memory (104) may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. The memory (104) may comprise information pertaining to input(s)/output(s) of each step performed by the system 100 and methods of the present disclosure.

The basic component of the neuromorphic FPGA architecture is a neuron (106-112) among the plurality of neurons configured for receiving a synaptic weight and a data set associated with an application. The architecture of the neuromorphic FPGA is parameterized and modular by optimizing the number/layer and position of the plurality of neurons in the neuromorphic FPGA circuit. Based on values of the plurality of features of the data set, the inferencing circuit can be automatically generated in a modular and parallel fashion. The plurality of features of the data set includes parameters like number of input data (like a number of pixels, in case of image), a time duration of the spike train, a number of classes, a bit-width of synaptic weights etc., The FIG. 1 illustrates a generic functional system of a neuromorphic FPGA architecture, wherein the plurality of neurons are arranged in plurality of layers in a modular and parallel fashion. The basic component of the neuromorphic FPGA architecture is a bio-plausible high-performance neuron. Each neuron among the plurality of neurons is interconnected with other neurons of a backward or a forward layer only through a plurality of synapses in multiple layers, and each of the neuron is mutually independent. With reference to the FIG. 1, the plurality of neurons is arranged in the plurality of layers, wherein the neurons in the first layer are represented as a neuron-11 (106), a neuron-12 (108) and a neuron-1N (110) (till a number N). Further neurons in the second layer are represented as a neuron-21 (112), a neuron-22 (114) and a neuron-2N (116) (till a number N). The neuromorphic FPGA architecture can comprise several such layers that can go up to a number (N), wherein the neurons in the Nth layer are represented as a neuron-N1 (118), a neuron-N2 (120) and a neuron-NN (122).

Based on a network topology and the application needs, the design of the neuromorphic FPGA architecture may change depending on plurality of features of the data set. The parallel architecture enables low latency and decreased energy consumed per inference Further, the modular design brings in high clock frequency. Frequency of entire circuit of neurons is 500 MHz on Alveo u280.

Post reset, the synaptic weight weights are transferred to a memory (104) and data set is applied to the plurality of neurons (106-122). The plurality of input spikes is used to calculate a latency from the clock when the first spike train is applied. In an embodiment, the system 100 can be implemented in a variety of computing systems including laptop computers, notebooks, hand-held devices such as mobile phones, workstations, mainframe computers, servers, a network cloud and the like.

Figure 2:
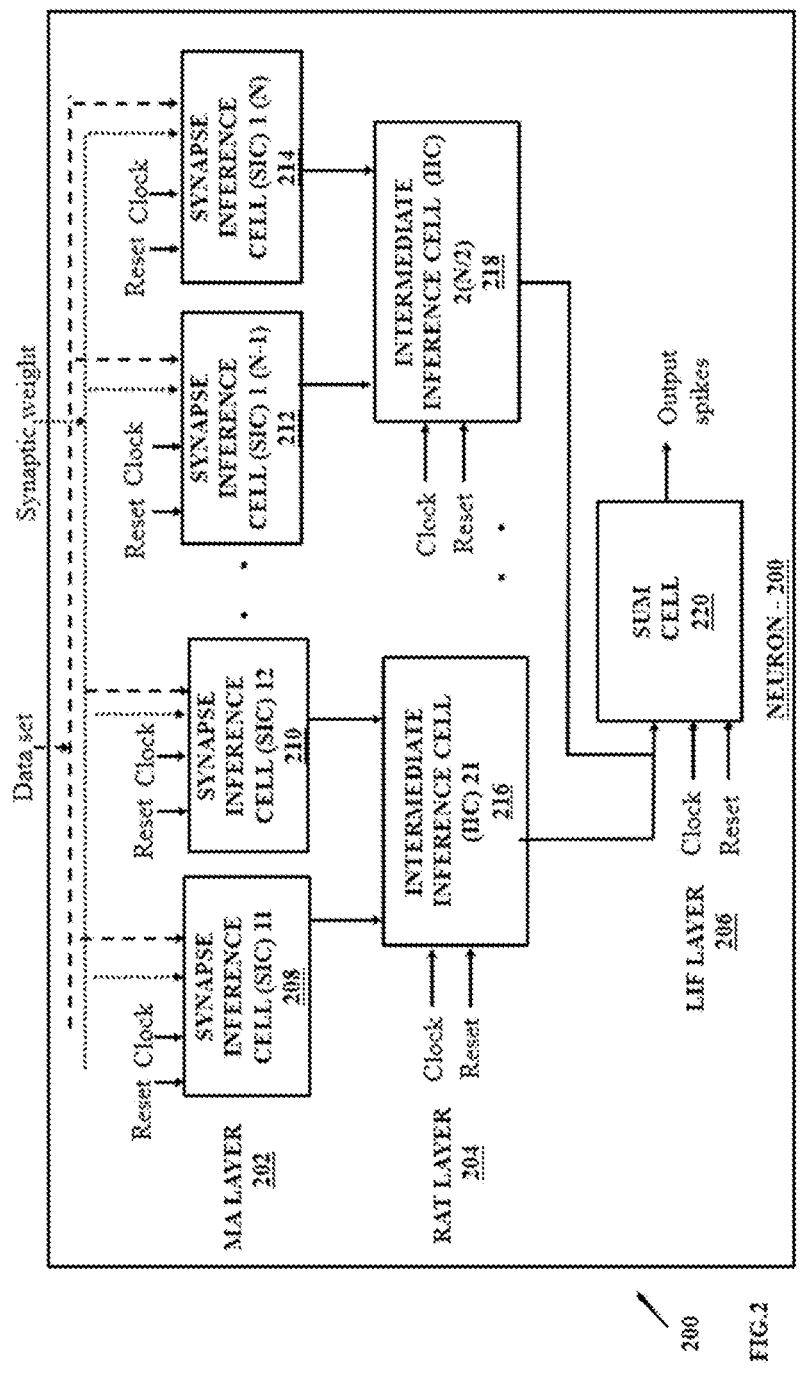
FIG. 2 is of a neuron, wherein the neuron is a basic component of the neuromorphic FPGA architecture for computing according to some embodiments of the present disclosure.
Figure 3A:
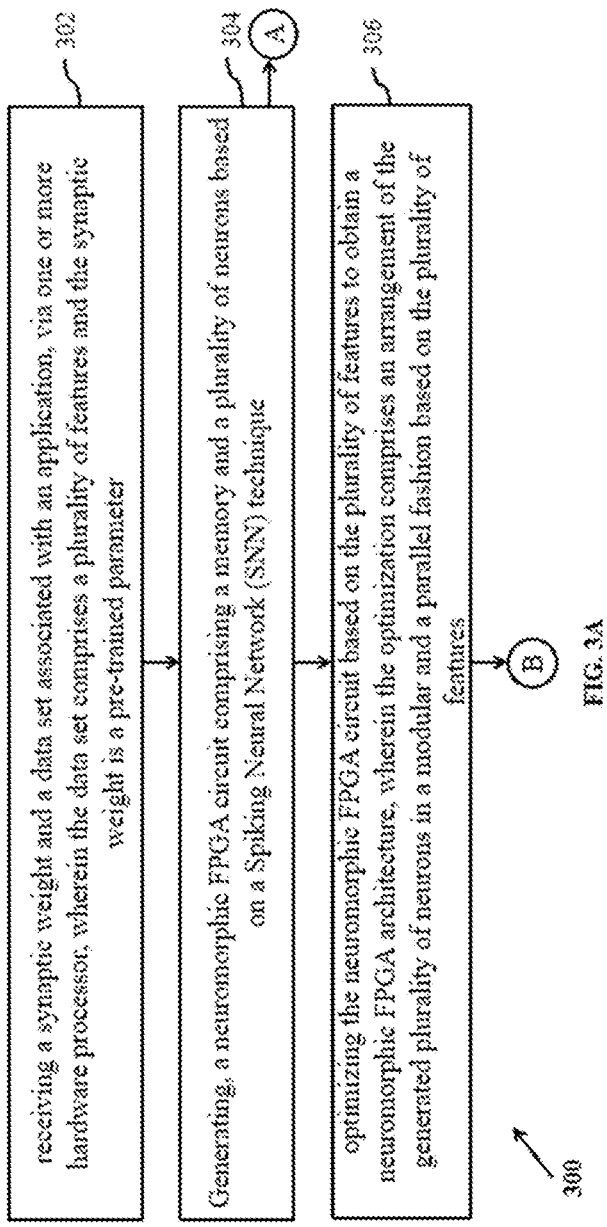
FIG. 3A, FIG. 3B and FIG. 3C is a flow diagram illustrating a method (300) for FPGA based neuromorphic computing architecture in accordance with some embodiments of the present disclosure.
Figure 3B:
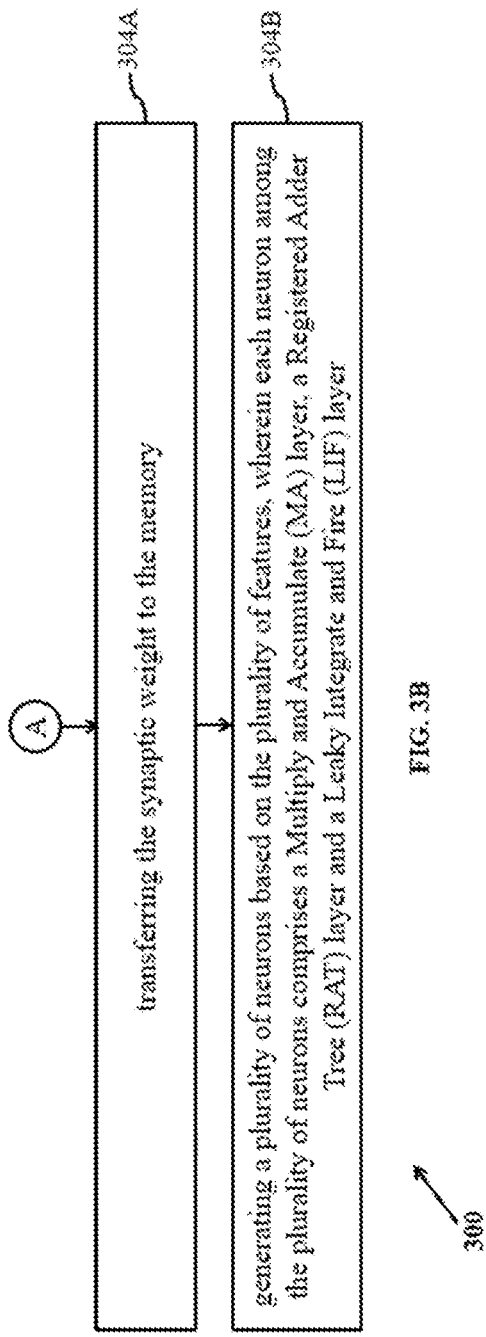
Figure 3C:
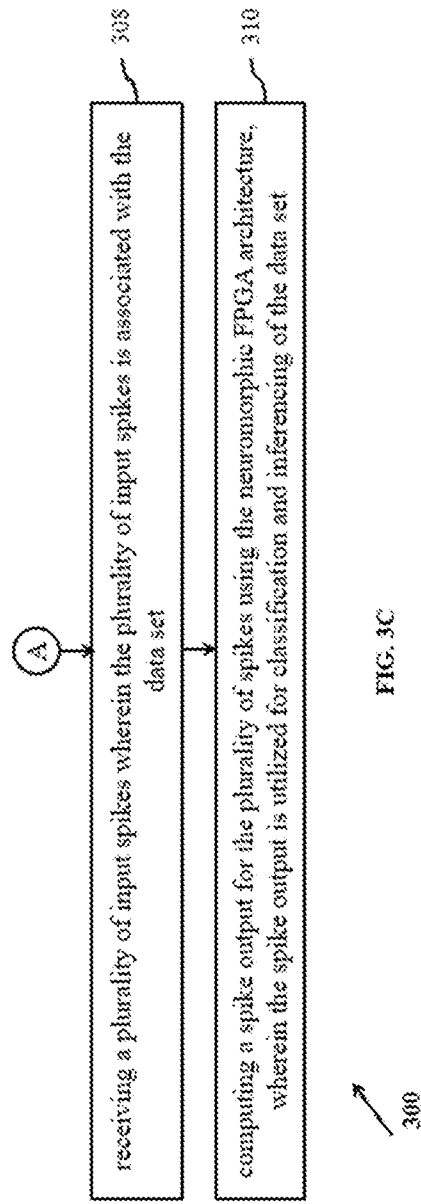

Functions of the components of system 100 are explained in conjunction with block diagram of a neuron among the plurality of neurons of system 100 in FIG. 2 and flow diagram of FIGS. 3A, 3B and 3C for FPGA based neuromorphic computing architecture.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a standalone device. In another embodiment, the system 100 may be implemented to work as a loosely coupled device to a smart computing environment. The components and functionalities of the system 100 are described further in detail.

FIG. 2 is an example block diagram of a neuron among the plurality of neurons of the system of FIG. 1, in accordance with some embodiments of the present disclosure. As depicted in the architecture, the FIG. 2 illustrates the architecture and functions of the neuron of the system 100 for FPGA based neuromorphic computing architecture.

Each neuron among the plurality of neurons comprises of three layers: (a) Multiply and accumulate (MA) layer, (b) registered adder tree (RAT) layer and (c) Leaky Integrate and Fire (LIF) layer.

Each neuron among the plurality of neurons is interconnected with other neurons of a backward or a forward layer only through a plurality of synapses in multiple layers, and each of the neuron is mutually independent. The MA layer is a single layer configured for multiplication and accumulation of the plurality of input spikes based on the pre-trained synaptic weight, wherein the MA layer is generated based on the plurality of features. The RAT layer comprises an adder configured for summation of the output from the MA layer. The LIF layer comprises a behavior mimicking biological neuron implemented digitally, wherein the LIF layer is configured for storing a plurality of voltages of corresponding a previous timestep, for summation of the plurality of input spikes and the pre-trained synaptic weight, generation of the plurality of output spikes, implementation of a leakage for a plurality of current time steps, and to reset voltage when receiving a new data set.

The various modules of the system 100 and the neuron in FIG. 2 that are configured for FPGA based neuromorphic computing architecture are implemented as at least one of a logically self-contained part of a software program, a self-contained hardware component, and/or, a self-contained hardware component with a logically self-contained part of a software program embedded into each of the hardware component that when executed perform the above method described herein.

Functions and architecture of the neuron of the system 200 are explained in conjunction with the system 100 stored in the memory 104 and further explained in conjunction with flow diagram of FIG. 3A, FIG. 3B and FIG. 3C. The FIG. 3A, FIG. 3B and FIG. 3C with reference to FIG. 1, is an exemplary flow diagram illustrating a method 300 FPGA based neuromorphic computing architecture using the system 100 of FIG. 1 according to an embodiment of the present disclosure.

The steps of the method of the present disclosure will now be explained with reference to the components of the system (100) for FPGA based neuromorphic computing architecture as depicted in FIG. 2 and the flow diagrams as depicted in FIG. 3A, FIG. 3B and FIG. 3C. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method (300), a synaptic weight and a data set associated with an application is received by the input module (102). The data set comprises a plurality of features and the synaptic weight is a pre-trained parameter.

In an embodiment, the data set associated with the application, wherein the application is a digital platform configured to perform a specific digital task for several domains or application comprising a set of computing tasks including an inference and a classification. In an example scenario, the application (digital platform) can be a trading platform from a finance domain, a ticket booking platform or a shopping/online store from a retail domain.

In an embodiment, the plurality of features of the data set includes parameters like number of input data (like a number of pixels, in case of image), a time duration of the spike train, a number of classes, a bit-width of synaptic weights etc., Based on values of the plurality of features of the data set, the inferencing circuit can be automatically generated in a modular and parallel fashion. Further, by default a FPGA also received a clock (also referred to as clk) and a reset (also referred to as rst) as inputs.

At step 304 of the method (300), the neuromorphic FPGA circuit is generated. The neuromorphic FPGA circuit comprises a memory (104) and a plurality of neurons (106-122). The neuromorphic FPGA circuit is generated based on a Spiking Neural Network (SNN) technique.

In an embodiment, the Spiking Neural Network (SNN) technique, wherein the SNN technique is technique to generate a network that receives input spikes and processes the received input spikes to generate output spikes. In an example scenario, the SNN technique includes a feed forward network.

In an embodiment, the generation of the neuromorphic FPGA circuit is characterized by comprising the following steps is explained with flow chart (300) as illustrated in FIG. 3C comprises:

At step 304A of the method (300), the synaptic weight from the input module (102) is transferred to the memory (104).

An FPGA comprises limited input/output pins. Hence the synaptic weights are stored inside the FPGA to make the processing more efficient. The synaptic weights that is saved in the input module (102) is later transferred to the memory (104) as required based on the processing.

At step 304B of the method (300), a plurality of neurons is generated based on the plurality of features. The FIG. 2 illustrates the architecture of each neuron among the plurality of neurons (106-122) from FIG. 1. The neuron as explained in detail in the FIG. 2 comprises a Multiply and Accumulate (MA) layer (202), a Registered Adder Tree (RAT) layer (204) and a Leaky Integrate and Fire (LIF) layer (206).

The MA layer (202) is a single layer configured for multiplication and accumulation of the plurality of input spikes based on the pre-trained synaptic weight, wherein the MA layer is generated based on the plurality of features. The MA layer is a single layer with a plurality of synapse inference cell (SIC). The MA layer is generated based on the plurality of features.

In an embodiment, the MA layer multiplies the plurality of input spikes by the corresponding synaptic weight and accumulate based on the equation shown below:

$$MA\ Layer = S_k W_k + S_{k+1} W_{k+1} \tag{1}$$

Wherein,

MA layer is an output of one SIC in the MA layer; and $S_k$ and $W_k$ are spike and weight respectively for $k^{th}$ synapses for $n^{th}$ neuron.

The MA layer (202) is a single layer and comprises of a plurality of synapse inference cell (SIC), wherein the SIC is also referred to as MA blocks. The terms MA blocks and SIC is interchangeably used in the description of the disclosure. In the FIG. 1, the SIC is represented by synapse inference cell (SIC) 11 (208), synapse inference cell (SIC) 12 (210), synapse inference cell (SIC) 1 (N-1) (212) & synapse inference cell (SIC) 1(N) (214). The SIC cells within the MA layer is generated based on the plurality of features. The number of inputs of the plurality of features is used for deciding the number of MA blocks (also referred to as SIC cells), wherein the MA blocks (SIC) is half the number of inputs. Also, one MA block (SIC) operates on not more than two inputs. In an example scenario if plurality of features has 8 parameters (8 inputs), then the MA layer has 4 SIC cells.

The RAT layer (204) comprises an adder configured for summation of the output from the MA layer, wherein the output from the plurality of SIC are summed in the RAT layer. The RAT layer comprises of a plurality of Intermediate inference cell.

The FIG. 2 illustrates the RAT layer (204) which comprises of a plurality of IIC represented as Intermediate inference cell (IIC)–21 216 and Intermediate inference cell (IIC)–2(N/2) 218. The RAT layer (204) receives the multiplicated and accumulated plurality of input spikes from the output of MA layer (202), wherein the output from the plurality SIC are summed in the RAT layer. The RAT layer (204) is configured for summation of the output from the MA layer, which is represented as:

$$RAT\ layer\ output = (\Sigma_{k=0}^{n} S_k W_k) \tag{2}$$

Wherein, $S_k$ and $W_k$ are spike and weight respectively for $k^{th}$ synapses for $n^{th}$ neuron.

In an embodiment, the input size of weights of adders are same as weights of output of MA layer. Number of adder blocks at RAT layer is half the number of outputs in the previous layer (the MA layer). Middle layer has only one layer as shown in FIG. 2, but multiple layers for adder tree are possible. Number of layers is determined by:

$$\log_2(Number\ of\ input) - 2. \tag{3}$$

where, each layer RAT takes one clock to process

The LIF layer (206) comprises a behavior mimicking biological neuron implemented digitally, wherein the LIF cell comprises of a single Sum Cell (220). The LIF layer is configured for storing a plurality of voltages of corresponding previous timestep, for summation of the plurality of input spikes and the pre-trained synaptic weight, generation of the plurality of output spikes, implementation of a leakage for a plurality of current time steps, and to reset voltage when receiving a new data set.

In an embodiment, the LIF layer implements the below functionality:

$$V_n(t) = \begin{cases} V_n(t-1) + \sum_{k=0}^{n} S_k W_k - C, & \text{otherwise} \\ 0, & V_n(t-1) < V_{thres} \end{cases} \tag{4}$$

$$S_n(t) = \begin{cases} 1, & V_n(t) > V_{thres} \\ 0, & \text{otherwise} \end{cases} \tag{5}$$

Wherein, $V_n$ is the voltage, $S_n$ is the spike at nth neuron,

C is constant representing voltage leakage at time t, and $S_k$ and $W_k$ are spike and weight respectively for kth synapses for n-th neuron.

The entire neuron circuit take latency of log 2 #Number_input, to process the one timestep, but it is highly pipelined. The neuron is designed to accept each timestep per clock. For e.g., at a given clock T (considering 8 input neurons), while LIF layer processes data corresponding to timestep T–2 then RAT layer processes data corresponding to timestep T–1 and MA layer may accept and process the data corresponding to timestep T. Further in each layer, no blocks take more than two inputs—which helps in reducing combinational delay there by giving high implementation frequency. Parallel processing helps reduce latency and energy/inference in availability of sufficient resources.

The neuron circuit is parameterized and modular. Based on values of parameters like number of input data (example: number of pixels, in case of image), time duration of spike train, number of classes, bit-width of synaptic weights etc., the inferencing circuit can be automatically generated in a modular fashion. Based on network topology and application needs, the design of this circuit may change depending on these input parameters. The modular design brings in high clock frequency. Frequency of entire circuit of neurons is 500 MHz on Alveo u280.

Figure 4:
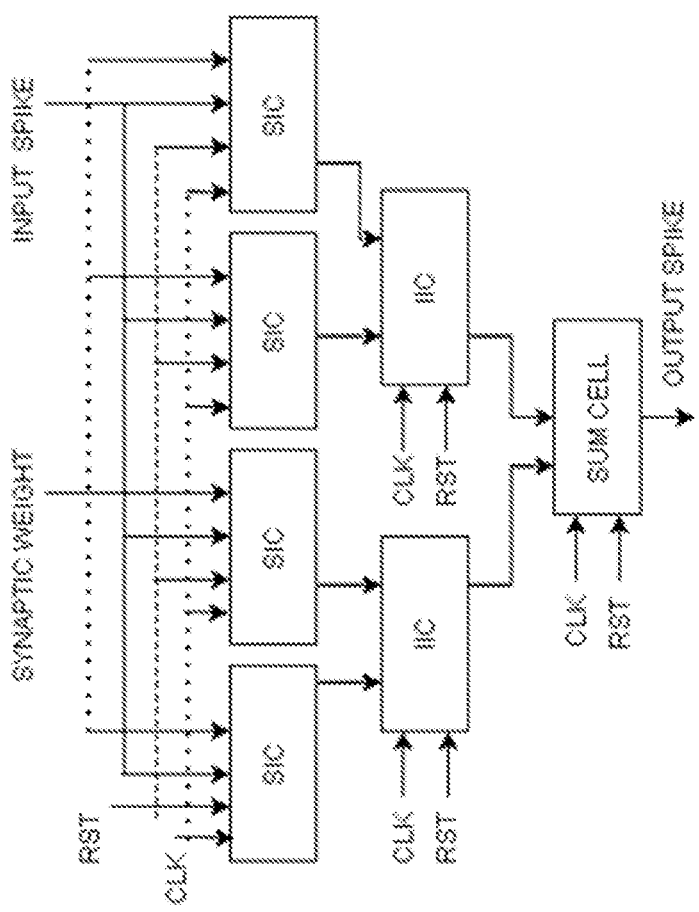
FIG. 4 is a diagram illustrating an 8-input neuron architecture in accordance with some embodiments of the present disclosure.

Considering an example scenario, a neuron generated for an 8-input data set is illustrated in FIG. 4. The neuron in FIG. 4 is generated for 8 input datasets based on the disclosed technique (as a customized/personalized architecture based on the generic neuromorphic architecture in FIG. 1) comprises four SIC in the MA layer, two IIC in the RAT layer and one Sum in the LIF layer. Another example scenario is illustrated in the FIG. 6, wherein the neuron has been generated for 16 input datasets based on the disclosed technique (as a customized/personalized architecture based on the generic neuromorphic architecture in FIG. 1) comprises eight SIC in the MA layer, four IIC in the RAT layer and one Sum in the LIF layer.

Referring to step 306 of the method (300), the neuromorphic FPGA circuit is optimized to obtain the neuromorphic FPGA architecture. The optimizing is based on the plurality of features to obtain the neuromorphic FPGA architecture. The optimization comprises an arrangement of the generated plurality of neurons in a modular and a parallel fashion based on the plurality of features.

The neuromorphic FPGA architecture is generated by optimizing a neuromorphic FPGA circuit based on the plurality of features, wherein the plurality of neurons (106-112) are arranged in a modular and a parallel fashion based on the plurality of features.

The basic component of the neuromorphic FPGA circuit that is optimized to generate the FPGA based neuromorphic architecture includes an input module (102), plurality of neurons (106-112) and one or more data storage devices or a memory (104). The memory (104) is operatively coupled to the plurality of neurons (106-112) to execute functions of one or more functional blocks of the system 100.

In an embodiment, the optimization of the neuromorphic FPGA circuit based on the plurality of features using a heuristic technique to obtain a modular and parallelized neuromorphic FPGA architecture. The architecture of the neuromorphic FPGA is parameterized and modular by optimizing the number/layer and position of the plurality of neurons in the neuromorphic FPGA circuit based on the heuristic technique.

The neuromorphic FPGA circuit is parameterized and modular, wherein the position and number (of layers) of the plurality of neurons are optimized based on the plurality of features based on the heuristic technique. In an example scenario, the heuristic techniques include a trial-error optimization that enables optimized tradeoffs between area, performance, and redundancy/latency, while focusing on FPGA implementation considerations, such as resource realization costs, to produce more efficient architecture, wherein the arrangement of the plurality of neurons is optimized based on the plurality of features. The arrangement of the plurality of neurons includes determining the number of neurons, the layers of neurons etc., to be optimized heuristically based on the plurality of features. The values of plurality of features include a number of input data (examples include a number of pixels, in case of image), time duration of spike train, number of classes, bit-width of synaptic weights etc., the inferencing circuit can be automatically generated in a modular fashion. Based on network topology and application needs, the design of this circuit may change depending on these input parameters. The modular design brings in high clock frequency. Frequency of entire circuit of neurons is 500 MHz on Alveo u280.

Figure 5:
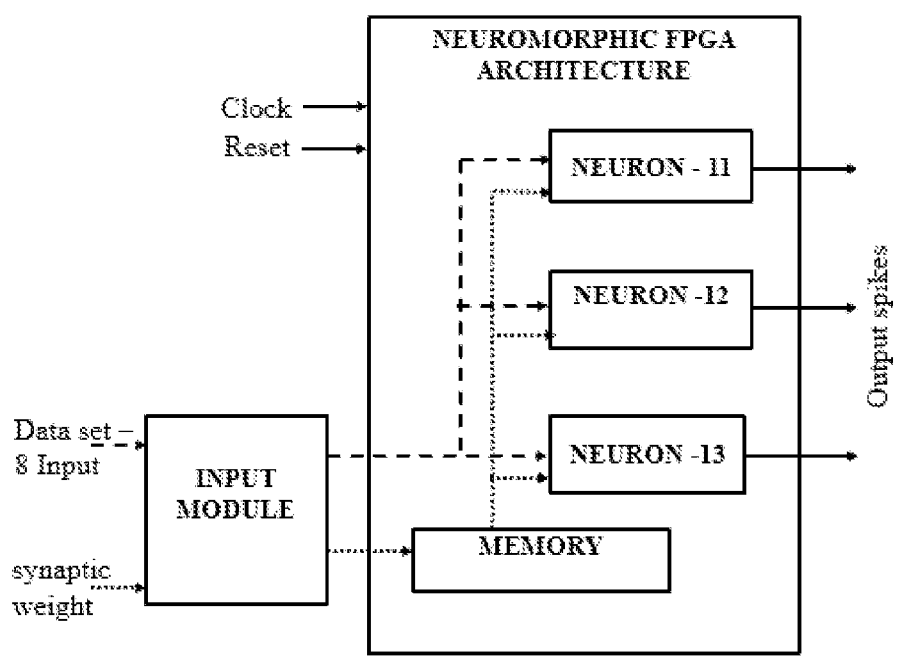
FIG. 5 is a diagram illustrating an 8-input FPGA neuromorphic architecture in accordance with some embodiments of the present disclosure.
Figure 6:
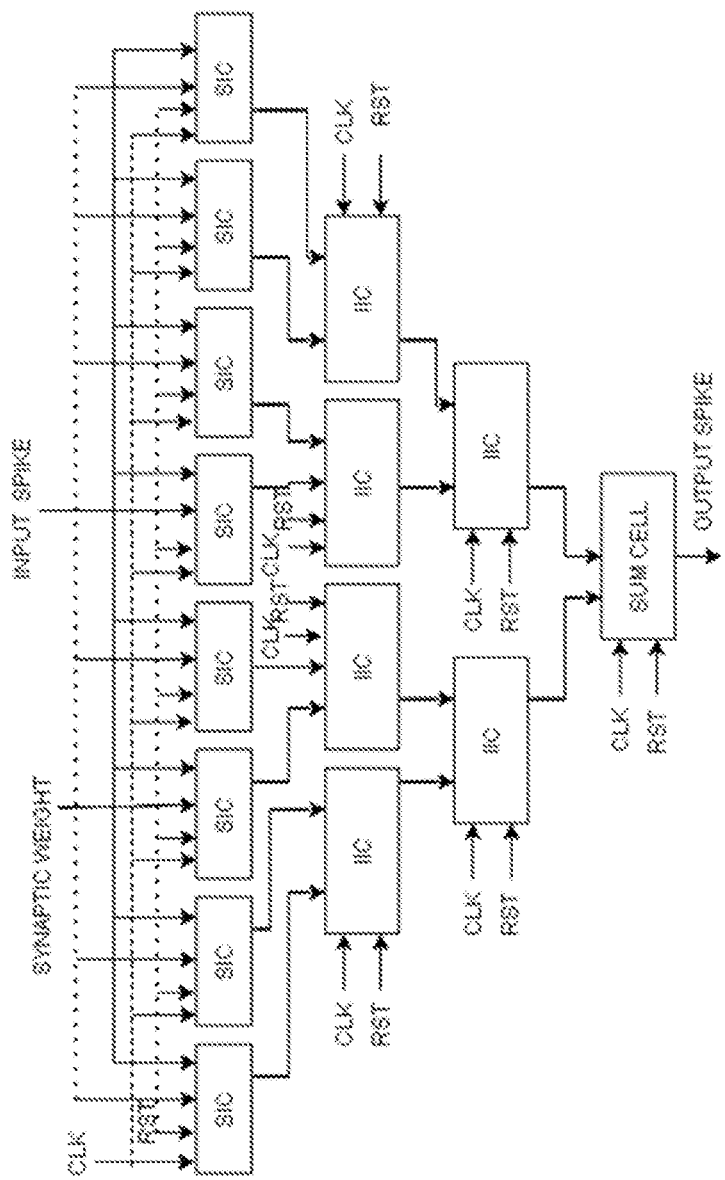
FIG. 6 is a diagram illustrating a 16-input neuron architecture in accordance with some embodiments of the present disclosure.
Figure 7:
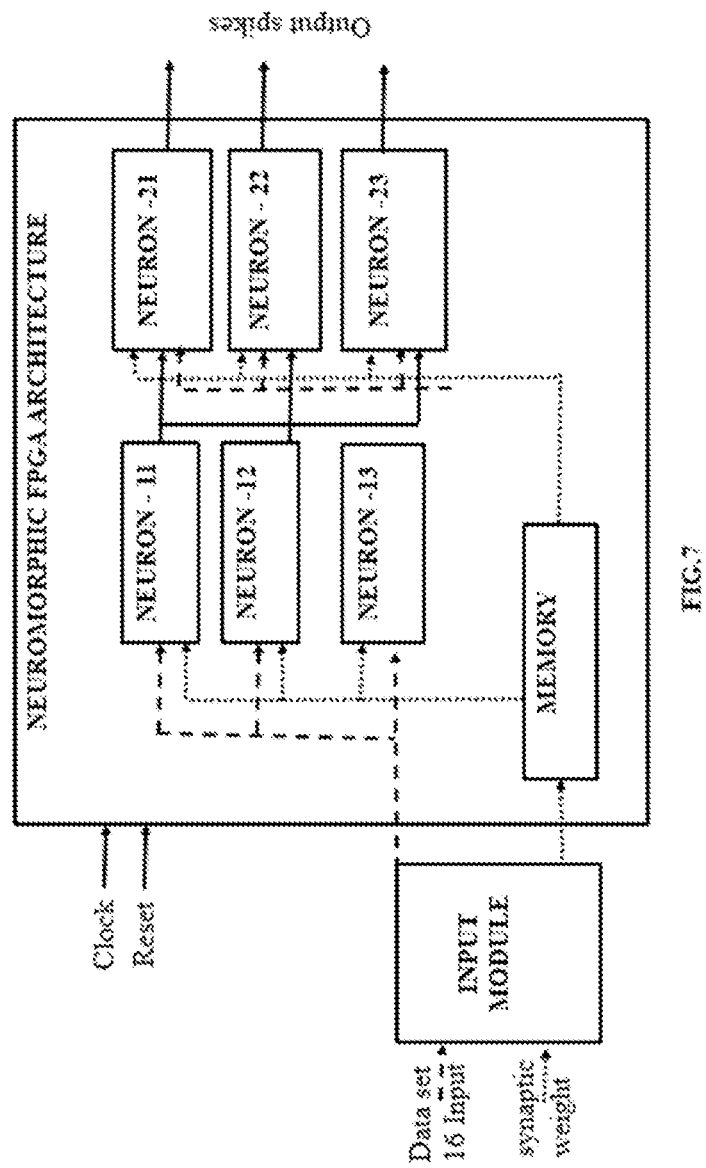
FIG. 7 is a diagram illustrating a 16-input FPGA neuromorphic architecture in accordance with some embodiments of the present disclosure.

Considering an example scenario as illustrated in FIG. 5 of a neuromorphic FPGA architecture with the neuron generated for an 8-input data set (illustrated in FIG. 4). The neuromorphic FPGA architecture of 8-input data set as illustrated in FIG. 5 comprises of a layer of neurons, comprising of 3 neurons in the layer. Further, another example scenario has been illustrated in FIG. 7 of a neuromorphic FPGA architecture with the neuron generated for a 16-input data set (illustrated in FIG. 6). The neuromorphic FPGA architecture of 16-input data set as illustrated in FIG. 6 comprises of two layers of neurons, each layer comprising of 3 neurons in the layer.

At step 308 of the method (300), receiving a plurality of input spikes in the input module (102). The plurality of input spikes is associated with the data set In an embodiment, the plurality of input spikes is associated with the dataset, wherein the data set associated with the application. The application is a digital platform configured to perform a specific digital task for several domains or application comprising a set of computing tasks including an inference and a classification. In an example scenario, the application (digital platform) can be a trading platform from a finance domain, a ticket booking platform or a shopping/online store from a retail domain. Hence the dataset can be in a variety of format including images, videos, text etc., The varied format of the dataset is converted into a plurality of input spikes using an encoder in the input module 102.

At step 310 of the method (300), a plurality of output spikes is computed for the plurality of spikes using the neuromorphic FPGA architecture. The plurality of output spikes is utilized for classification and inferencing of the data set In an embodiment, after a reset of the FPGA based neuromorphic architecture, a set of pre-trained synaptic weights are transferred into the memory via standard communication protocols such as an Advanced eXtensible Interface (AXI), a Serial Peripheral Interface (SPI) and an Inter-Integrated Circuit (I2C). The input spikes are fed into FPGA based neuromorphic architecture to start inferencing. During inferencing, plurality of input spikes from input and the synaptic weights from memory are fed into each neuron in parallel. The equations (4) and (5) are performed within LIF layer of each neuron to obtain the plurality of output spikes.

EXPERIMENTS

An experiment has been conducted with by implementing on Xilinx Vivado, 2019.2, Alveo u280 and implementation frequency is at 100 MHz. Experiments were carried on a standard MNIST dataset ($\mu$=28×28=784 pixels/image). Our proposed FPGA based neuromorphic computing architecture is also implemented on the same board with frequency 500 MHz. For both the cases, offline Poisson based rate encoding scheme for spike encoding is used in order to convert dataset (image data) into spike domain.

A spike trains of length 200 timesteps ($\delta$ is timestamp=200) has been utilized for experimentation purposes with $\beta_{OM}$ (minimum clocks required)=210. Thus, input data bandwidth requirement for conducting the experiment is 200×784/8=19.6 KB, in time 210/(500 MHz)=420×10−9 s. A set of a performance parameters are computed based on performance modelling equations (known in art) to obtain the value of $\gamma$ (average number of synaptic spikes per timestamp) is 25.1 on average, $\varepsilon$ (Number of classes) for MNIST dataset is 10, $\theta$ (Clocks per synaptic weights) is 2 for the ODIN, $\pi$ (power consumed) is 3.15 W for ODIN, and 4.5 W for our method on Alevo u 280. $\beta_{ODIN}$ (Minimum clocks required for ODIN)=1 E5, while $\beta_{OM}$=209, $\Delta t_{ODIN}$ (clock period for ODIN)=10 ns, while $\Delta t_{OM}$ (clock period for the disclosed techniques)=2 ns. Also, for Alveo 280 $\pi_{ODIN}$=3.17 W while $\pi_{OM}$=5.03 W and energy efficiency is $\alpha_{ODIN}$ (total energy per inference for ODIN)=3.2 mJ and $\alpha_{OM}$ (total energy per inference for the disclosed technique)=2.1 µJ.

For experimentation purposes, a comparison has been conducted with an existing Online-Learning Digital spiking Neuromorphic Processor (ODIN) wherein, an 84% test accuracy has been obtained for both ODIN and disclosed technique running on FPGA using Modified National Institute of Standards and Technology database (MNIST). The results have been tabulated as shown in Table 1, wherein the disclosed technique is more efficient compared to ODIN in terms of clock latency, frequency of clock, throughput, energy/inference by factor of 478, 5, 2403 and 1523 times, respectively.

TABLE 1

Comparison of ODIN (Existing state of art) and disclosed technique

| Architecture | Latency (Clocks) | Frequency of clocks (MHz) | Throughput (in 1000) | Power (watts) | Energy/inf(J) |
|---|---|---|---|---|---|
| Existing state of art (ODIN FPGA) | 1E5 | 100 | 13 | 319 | 3.2E−3 |
| Disclosed technique | 210 | 500 | 2403 | 5.03 | 2.16E−6 |

Further Table 2, compares latency, energy/inference, maximum clock frequency, and platform/architecture of the disclosed technique with existing state of art technique (ODIN). It is observed that the disclosed technique has substantially smaller value of latency compared to existing state of art technique.

TABLE 2

Comparison of performance across a state of art technique and the disclosed technique

| Architecture | Latency (Clocks) | Energy/Inference (J) | Max. Clock frequency |
|---|---|---|---|
| Existing state of art (ODIN FPGA) | 1E−3 | 3.2E−3 | 100 MHz |
| Disclosed technique | 4.2E−7 | 2.1E−6 | 500 MHz |

Hence, based on the experiment section it can be concluded that:

Energy/inference is improved by ~1500 times,

Latency and Throughput is improved by ~2400 times.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

SNNs are inspired from mammalian brains as the SNNs implements a neuron for synaptic functionalities and learning mechanisms. The existing ASIC based techniques/architecture receives a spike train comprises N synaptic events (S1, S2, . . . SN), at a single timestep, as shown in FIG. 8A. The existing ASIC based architectures processes each of the said input spikes sequentially, wherein the M represents total number of spike trains for N synapses for a single timestamp as illustrated in FIG. 8B. During inference in a classification task, each spike results into X synaptic events, where X is number of classes and each synaptic event (S) consumes 2 clocks. Thus, existing ASIC based architectures takes a total M*2T clocks to process whole spike train (sequentially) which is represented as (M*2T) on FIG. 8B, thus bringing in huge latency and increased energy consumed per inference. However, the disclosed technique is based on parallel and modular architecture and hence utilizes only time (T)— as illustrated in FIG. 8C. Hence in comparison to time (M*2T) utilized the existing state of art, the disclosed techniques utilize only time T, thus solving the problem of huge latency, while also bringing in decreased energy consumption.

The embodiments of present disclosure herein address the above unresolved problem of huge latency and decreased energy consumed per inference in neuromorphic computing. From the experiment section it can be concluded that energy/inference is improved by ~1500 times, and Latency-Throughput is improved by 2400 times.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A field programmable gate array (FPGA) neuromorphic architecture-based method for computing comprising:
    receiving a synaptic weight and a data set associated with an application, wherein the data set comprises a plurality of features and the synaptic weight is a pre-trained parameter;
    generating a neuromorphic FPGA circuit comprising a memory and a plurality of neurons based on a Spiking Neural Network (SNN) technique, where in the generation of the neuromorphic FPGA circuit is characterized by comprising the following steps:
        transferring the synaptic weight to the memory; and
        generating a plurality of neurons based on the plurality of features, wherein each neuron among the plurality of neurons comprises a Multiply and Accumulate (MA) layer, a Registered Adder Tree (RAT) layer and a Leaky Integrate and Fire (LIF) layer;
    optimizing via the one or more hardware processors, the neuromorphic FPGA circuit based on the plurality of features to obtain a neuromorphic FPGA architecture, wherein the optimization comprises an arrangement of the generated plurality of neurons in a modular and a parallel fashion based on the plurality of features;
    receiving a plurality of input spikes, wherein the plurality of input spikes is associated with the data set; and
    computing a plurality of output spikes for the plurality of input spikes using the neuromorphic FPGA architecture, wherein the plurality of output spikes is utilized for classification and inferencing of the data set,
    wherein each neuron among the plurality of neurons is interconnected with other neurons of a backward or a forward layer only through a plurality of synapses in multiple layers, and each of the neuron is mutually independent.

2. The method of claim 1, wherein the application is a digital platform executed by the one or more hardware processors to perform a specific digital task for several domains or application comprising a set of computing tasks including an inference and a classification.

3. The method of claim 1, wherein the MA layer is a single layer executed by the one or more hardware processors for multiplication and accumulation of the plurality of input spikes based on the pre-trained synaptic weight, wherein the MA layer is generated based on the plurality of features.

4. The method of claim 1, wherein the RAT layer comprises an adder executed by the one or more hardware processors for summation of the output from the MA layer.

5. The method of claim 1, wherein the LIF layer comprises a behavior mimicking biological neuron implemented digitally, wherein the LIF layer is executed by the one or more hardware processors for storing a plurality of voltages of corresponding timestep, for summation of the plurality of input spikes and the pre-trained synaptic weight, generation of the plurality of output spikes, implementation of a leakage for a plurality of current time steps, and to reset voltage when receiving a new data set.

6. The method of claim 1, wherein the optimization of the neuromorphic FPGA circuit based on the plurality of features using a heuristic technique to obtain a modular and parallelized neuromorphic FPGA architecture.

7. A system comprising:
    a memory storing instructions, one or more communication interfaces, and one or more hardware processors coupled to the memory via the one or more communication interfaces, wherein the instructions executed by the one or more hardware processors to: receive a synaptic weight and a data set associated with an application, wherein the data set comprises a plurality of features and the synaptic weight is a pre-trained parameter;
    generating a neuromorphic FPGA circuit comprising a memory and a plurality of neurons based on a Spiking Neural Network (SNN) technique, where in the generation of the neuromorphic FPGA circuit is characterized by comprising the following steps:
    transfer the synaptic weight to the memory; and
    generate a plurality of neurons based on the plurality of features, wherein each neuron among the plurality of neurons comprises a Multiply and Accumulate (MA) layer, a Registered Adder Tree (RAT) layer and a Leaky Integrate and Fire (LIF) layer;
    optimize via the one or more hardware processors, the neuromorphic FPGA circuit based on the plurality of features to obtain a neuromorphic FPGA architecture, wherein the optimization comprises an arrangement of the generated plurality of neurons in a modular and a parallel fashion based on the plurality of features;
    receive a plurality of input spikes, wherein the plurality of input spikes is associated with the data set; and
    compute a plurality of output spikes for the plurality of input spikes using the neuromorphic FPGA architecture, wherein the plurality of output spikes is utilized for classification and inferencing of the data set,
    wherein each neuron among the plurality of neurons is interconnected with other neurons of a backward or a forward layer only through a plurality of synapses in multiple layers, and each of the neuron is mutually independent.

8. A computer program product comprising a non-transitory computer readable medium having a computer readable program embodied therein, wherein the computer readable program, when executed on a computing device, causes the computing device to:
    receive a synaptic weight and a data set associated with an application, wherein the data set comprises a plurality of features and the synaptic weight is a pre-trained parameter;
    generate a neuromorphic FPGA circuit comprising a memory and a plurality of neurons based on a Spiking Neural Network (SNN) technique, where in the generation of the neuromorphic FPGA circuit is characterized by comprising the following steps:

transferring the synaptic weight to the memory; and generating a plurality of neurons based on the plurality of features, wherein each neuron among the plurality of neurons comprises a layer, a Registered Adder Tree (RAT) layer and a Leaky Integrate and Fire (LIF) layer;

optimize via the one or more hardware processors, the neuromorphic FPGA circuit based on the plurality of features to obtain a neuromorphic FPGA architecture, wherein the optimization comprises an arrangement of the generated plurality of neurons in a modular and a parallel fashion based on the plurality of features;

receive a plurality of input spikes, wherein the plurality of input spikes is associated with the data set; and compute a plurality of output spikes for the plurality of input spikes using the neuromorphic FPGA architecture, wherein the plurality of output spikes is utilized for classification and inferencing of the data set, wherein each neuron among the plurality of neurons is interconnected with other neurons of a backward or a forward layer only through a plurality of synapses in multiple layers, and each of the neuron is mutually independent.

\* \* \* \* \*